(12) United States Patent
Siddarth et al.

(10) Patent No.: US 11,934,442 B2
(45) Date of Patent: Mar. 19, 2024

(54) METHODS AND SYSTEMS FOR MANAGING DIFFERENT VERSIONS OF A DOCUMENT IN A DOCUMENT MANAGEMENT SYSTEM

(71) Applicant: XEROX CORPORATION, Norwalk, CT (US)

(72) Inventors: Jaya Siddarth, Chennai (IN); Harshini Damodaran, Vellore (IN); Sowjanya Mahendran, Madurai (IN); Saranya Loganathan, Chennai (IN)

( * ) Notice: Subject to any disclaimer, the term of this patent is extended or adjusted under 35 U.S.C. 154(b) by 0 days.

(21) Appl. No.: 17/746,154

(22) Filed: May 17, 2022

(65) Prior Publication Data

US 2023/0409625 A1    Dec. 21, 2023

(51) Int. Cl.
    *G06F 16/387*    (2019.01)
    *G06F 16/18*     (2019.01)

(52) U.S. Cl.
    CPC ........ *G06F 16/387* (2019.01); *G06F 16/1873* (2019.01)

(58) Field of Classification Search
    CPC . G06F 16/1873; G06F 16/387; G06F 16/1787
    USPC ....................................................... 707/695
    See application file for complete search history.

(56) References Cited

U.S. PATENT DOCUMENTS

| | | | | |
|---|---|---|---|---|
| 8,990,174 | B2* | 3/2015 | Ward | G06F 21/105 707/695 |
| 9,460,348 | B1* | 10/2016 | Adam | G06V 20/30 |
| 2002/0052910 | A1* | 5/2002 | Bennett | G06F 9/454 718/104 |
| 2004/0259574 | A1* | 12/2004 | Daniels | H04M 3/436 455/411 |
| 2008/0154905 | A1* | 6/2008 | Paalasmaa | G06F 16/9577 |
| 2008/0320225 | A1* | 12/2008 | Panzer | H04L 67/02 711/E12.017 |
| 2016/0378454 | A1* | 12/2016 | Nekrestyanov | G06F 8/65 717/170 |
| 2020/0050588 | A1* | 2/2020 | Bhogal | G06F 16/1787 |
| 2021/0365417 | A1* | 11/2021 | Otsuka | G06F 16/1873 |

OTHER PUBLICATIONS

Laserfiche—Why Mapping, Geolocation are Where It's At Blog—2022, 4 Pages, Laserfiche—Publisher.

(Continued)

*Primary Examiner* — Cam Linh T Nguyen

(57) ABSTRACT

The present disclosure discloses methods and systems for managing different versions of a document in a document management system. The method includes receiving a request at the document management system from a user to access a document, wherein the document management system stores multiple versions of the document along with respective location information. Further, the method includes checking whether a location option is enabled at the document management system. Furthermore, based on the check, a version of the document matching the location of the user from where the user is accessing it, is presented to the user, via a user interface, for further action. The methods and systems further allow the user to upload one or more documents versions, where the document versions are stored along with location information for easy access, later retrieval and/or use.

18 Claims, 15 Drawing Sheets

(56) References Cited

OTHER PUBLICATIONS

Xerox—User-defined workflows in Xerox DocuShare automate business processes to boost efficiency Literature—2019, 2 Pages, Xerox—Publisher.

DOCSTAR (An EPICOR company) Linking GIS and Document Management Blog—2022, 1 Page, Epicor Software Corporation—publisher.

* cited by examiner

| VERSIONS | | | | |
|---|---|---|---|---|
| PREFERRED VERSION | | | | |
| ☐ | ▼ TYPE ◆ TITLE | LOCATION | ◆ OWNER | ◆ CREATE DATE |
| ☐ 1 | 📄 ABC Hospital Form.pdf | USA Location<br>Latitude:<br>11.0361808<br>Longitude:<br>60.2322898 | *Mr. 12* | 14/12/2021 @05:24 |
| ALL VERSIONS | | | | |
| Selected Actions ▼ | | | | |
| ☐ # | ▼ TYPE ◆ TITLE | LOCATION | ◆ OWNER | ◆ CREATE DATE |
| ☐ 2 | 📄 ABC Hospital Form.pdf.v2 | France Location<br>Latitude:<br>13.0362808<br>Longitude:<br>80.2322898 | *Mr. 12* | 14/12/2021 @05:24 |
| ☐ 1 | 📄 ABC Hospital Form.pdf | USA Location<br>Latitude:<br>11.0361808<br>Longitude:<br>60.2322898 | *Mr. 12* | 14/12/2021 @05:24 |

FIG. 3F

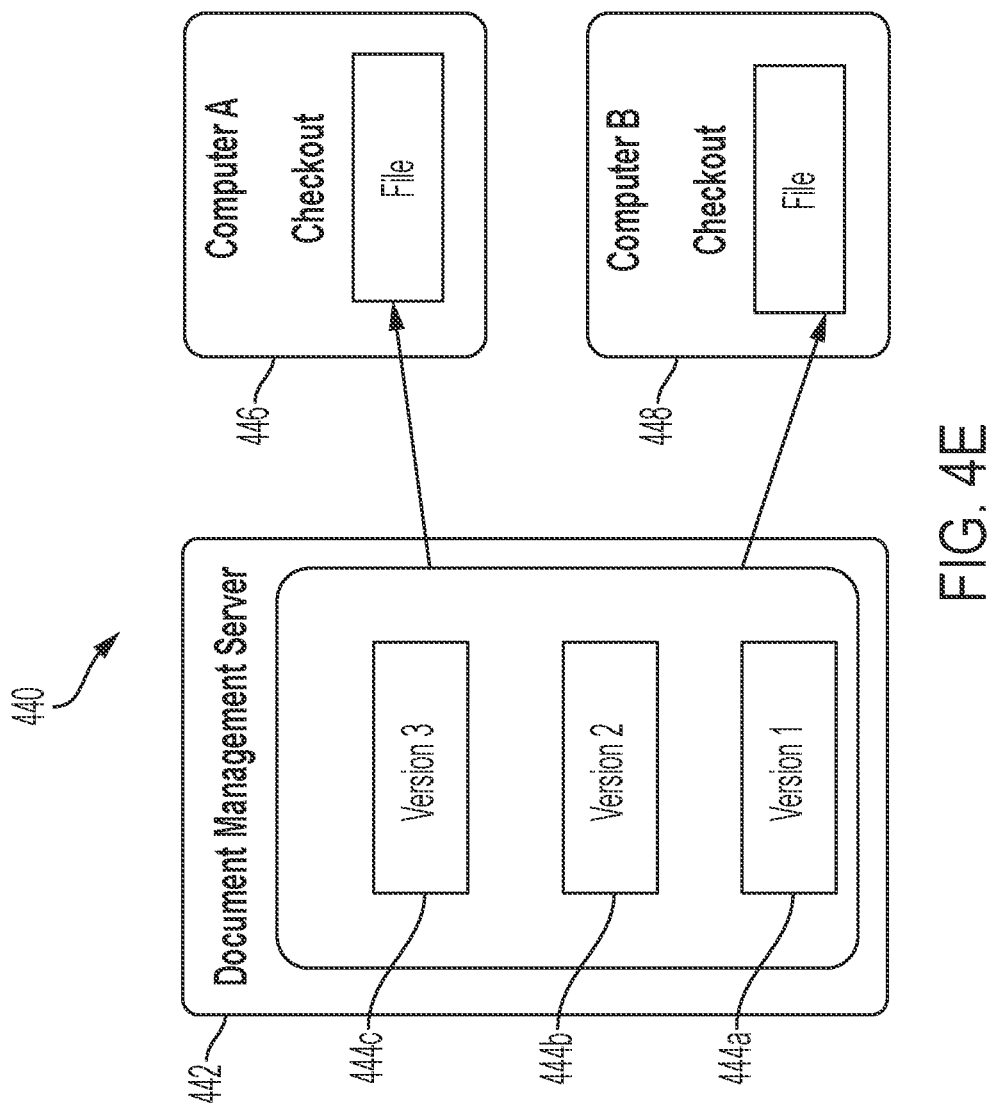

METHODS AND SYSTEMS FOR MANAGING DIFFERENT VERSIONS OF A DOCUMENT IN A DOCUMENT MANAGEMENT SYSTEM

TECHNICAL FIELD

The present disclosure relates to document management system, more specifically the disclosure relates to systems and methods for managing different versions of a document in a document management system.

BACKGROUND

A document management system is a software/application that allows users to manage their documents including upload, store, organize or track their documents. The documents can be PDFs, MS word files, or images. Lately, the document management system has become an essential part of almost all organizations such as banks, hospitals, colleges, government offices, corporate offices, recruitment agencies, etc. The document management system facilitates secure, structured and controlled access of any documents within the organization. One of the popular features of the document management system is version management, it allows managing multiple versions of a document (the same document or similar document).

Different versions of the document are created when one or more users make edits in the document and save the edited document. The multiple document versions can be later uploaded by the user. Typically, when multiple versions of a single document are stored, then in most cases, the last uploaded version of the document is shown to all users. The last/recently updated/uploaded version of the document is displayed as a preferred document in a document folder, i.e., the folder including the document, of the document management system. The remaining versions of the document are listed and displayed in a separate folder, for example, a version history folder. Here, a single version of the document is displayed as the preferred document to all user as it is configured based on a static/fixed parameter, which is mostly the last uploaded/updated document. But there can be scenarios in which a particular user wishes to access or view a different version of the document instead of the last updated or uploaded version.

Taking an example where different versions of a sales report of a company are stored on a document management system. Here, different versions of the sales report include 3 versions of sales data of different sites of the company. For instance, the first version includes sales data of a company's site located in the United States, the second version includes sales data of a company's site located in China, and the third version includes sales data of a company's site located in France, the last uploaded sales data. So, a user located in the United States may wish to view the first version of the sales report as the preferred version, and a user located in China may wish to view the second version of the sales report as the preferred version, and so on. However, the existing solutions only show the last uploaded or updated version of the sales data i.e., sales data for the company's site located in France to all three users. In some cases, if the user wishes to view a specific version, say, based on his location, then the user is required to manually search for the required version. This could be annoying and time-consuming for the user.

In this light, there is a need for improvised systems and methods to manage different versions of the document.

SUMMARY

According to aspects illustrated herein, a method for managing different versions of a document in a document management system is disclosed. The method includes receiving a request at the document management system from a user to access a document, wherein the document management system stores multiple versions of the document along with respective location information. Further, the method includes checking whether a location option is enabled at the document management system. Furthermore, based on the check, a version of the document matching the location of the user from where the user is accessing it, is presented to the user, via a user interface, for further action.

According to further aspects illustrated herein, a document management system for managing different versions of a document is disclosed. The document management system includes a database for storing multiple versions of a document, wherein at least one version of the document is stored along with location information. The document management system further includes a server for receiving a request from a user to access a version of the document. The server checks whether a location option is enabled at the document management system. Further, the server receives location information of the user and automatically retrieves a document version matching the location of the user. Furthermore, the document management system includes an application for presenting the retrieved document version to the user, for further action.

According to further aspects illustrated herein, a method for storing multiple versions of a document in a document management system is disclosed. The method includes receiving a request from a user to store a document version. Before storing, it is checked if a location option is enabled by the user, before storing. Based on the check, location information of the user is identified. Thereafter, the document version is stored in the document management system, along with location information for later retrieval, access and/or use.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 3A-3F show exemplary snapshots of user interfaces, in accordance with an embodiment of the present disclosure.

FIGS. 4A-4E illustrate exemplary snapshots, in accordance with an embodiment of the present disclosure.

DESCRIPTION

Figure 1:
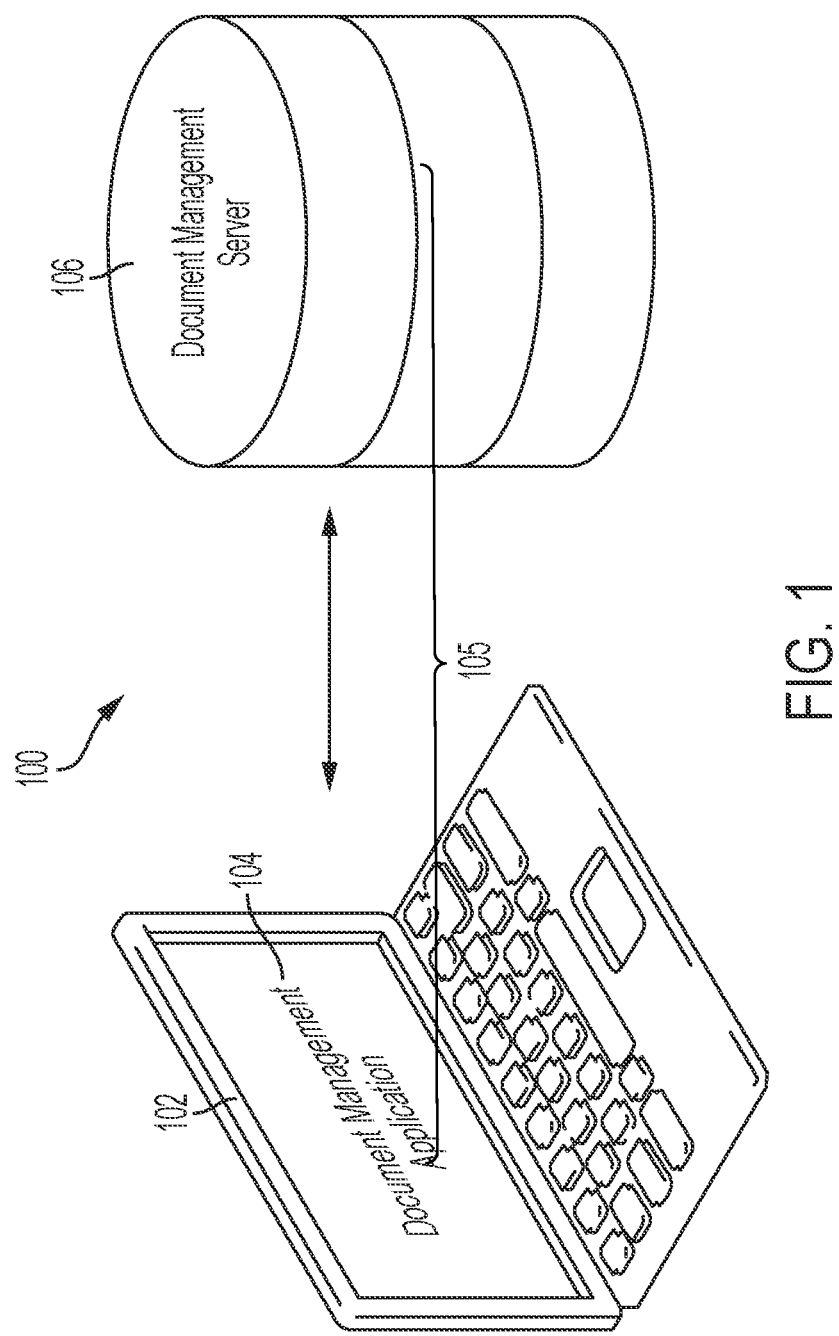
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "document management system" refers to a software/application that allows a user to manage his documents and/or different versions of the documents. For example, the document management system allows the user to upload documents, store documents, track documents, view, read or access documents, etc. The document management system can be implemented in the form of an application that can be a web-based application or an app running on a computing device or a mobile device. In the context of the disclosure, the document management system considers location as a property for documents and/or different versions of the documents based on a requirement and/or based on a preference of the user. For example, the document management system adds location as a property for a particular version of a document when that document version is uploaded by the user. In another example, the document management system determines a location of the user and displays a preferred version of a document based on the determined location of the user. The document management system can be implemented in the form of a front-end and a back-end. The front-end includes a user interface/application that allows the user to upload a document/version of a document, access the document version, track the document version, or the like. The back-end includes a server that manages different versions of the document. For example, the server stores different versions of the document in a database, where the database can be a part of the server or can be a separate entity. The server authenticates the user, determines the location of the user, retrieves the matching document version for the user. These are few examples but the server and/or front-end can include additional functionality to manage different versions of the document.

The term "document" refers to a document in digital form having content in the form of text, image, graphics, or a combination thereof. The document can have a single page or can be a multi-page document. The document can be in any format such as PDF, MS Word, MS PPT, any known formats, or later developed formats. The document in context of the current disclosure refers to a document version.

The term "document versions" refer to multiple copies of the same document with some changes/modifications in the content. The modifications can be done by a single user or can be done by multiple users. The document versions refer to different versions of the same document.

The term "preferred version" refers to a version shown to a user when the user accesses a particular document version stored in the document management system. Typically, the preferred version is the last updated or recent version of the document stored in the document management system. In context of the current disclosure, the preferred version refers to a version of the document shown/displayed to the user matching the location of the user. The preferred version can be different for different users based on their respective locations.

The term "location" refers to a location of the user where he is present while uploading a version of the document and/or while accessing the document version. For example, a user may upload a document version from a location such as New Delhi, India but another user may access a document version from another location such as Mumbai, India. These are two just examples but other variations can be implemented. The location can be determined based on coordinates such as latitude and longitude.

The "user" here includes any user who can access the document management system for various purposes such as uploading a document version, tracking a document version, storing a document version, accessing a document version, editing a document version, or the like. The user here refers to a registered user who has rights to access the document management system.

The term "matching" refers to matching location of the user accessing a document version with location associated with one or more document versions stored in the document management system. The matching is performed to set and to further display a preferred version of the document to the user. To accomplish this, first a current location of the user is identified and the identified location is matched with location associated with different document versions stored in the document management system. The document version for which the associated location matches with the identified location of the user is considered and further displayed as the preferred version. Here, the matching can be performed based on exact match, closest match or an approximate match of the location. In one example, a document version for which the associated location matches exactly with the identified location of the user is displayed as the preferred version. In another example, a document version for which the associated location is closest or proximate to the identified location of the user is displayed as the preferred version. For instance, for a document stored in the document management system, the location associated with $1^{st}$ version of the document is ABC location in Delhi, India and the location associated with $2^{nd}$ version of the document is DEF location in Bombay, India. Now, when a user accesses a document version from XYZ location in Delhi, India (i.e., from a location different from the locations associated with both the $1^{st}$ version and $2^{nd}$ version), then $1^{st}$ version of the document is displayed as the preferred version, as the XYZ location is considered closest match (proximate) to the location ABC in Delhi, India.

The term "computing device" refers to a device that a user typically uses for his day-to-day work such as email, work, chatting, surfing, managing documents in a document management system and other purposes. Examples of the computing device include, but are not limited to, a personal computer, a desktop, a laptop, a mobile device/phone, a tablet, a Personal Digital Assistant (PDA), a smartphone, or any other device capable of accessing document management system. The computing device includes one or more applications. In the context of the current disclosure, the computing device includes an application such as a web-based application or an app that allows the user to access, store, upload, edit, share document versions or different versions of documents in the document management system.

Overview

The present disclosure discloses methods and systems for managing different versions of a document in a document management system. Specifically, the methods and systems manage location associated with different versions of a document. For example, when a user uploads a document version in the document management system, the document management system stores location as a property when storing the document version for later retrieval and/or access. Later, when a user accesses a document, a version of the document matching the location of the user is shown as a preferred version of the document. The preferred version of the document can be considered for further action such as reading, printing, sharing, editing, filling out, or a combination thereof.

For instance, a user A uploads 1st version of a document in a folder A, such as medical form from a location such as Oberoi Hotel in Delhi, India, the document management system stores the document version along with the corresponding location property of the user i.e., the location from where the user uploads the document. Later, when the user uploads another version of the document in the folder A from a different location such as the Empire State Building, New York, United States, the document management system stores the document version along with this location of the user. Later when the user accesses the document management system, specifically, the medical form folder, the document management system displays a version of the document that matches the location of the user. In this case, the document version 1 is displayed to the user for further action as the location of the user is New Delhi, India. When another user accesses the document management system for medical form, specifically, accesses the folder A, the document management system displays a document version 2 to the user as a preferred version of the document as this user location is United States. This way, the methods and systems automatically set the preferred document version as a document version matching the location of the user who is accessing it. This allows the user to access the relevant document version without performing any manual search.

Exemplary Environment

FIG. 1 shows an exemplary environment 100 in which various embodiments of the disclosure can be practiced. The environment 100 is shown to include a computing device 102 and a document management server 106. The computing device 102 further includes a document management application 104 running on the computing device 102. The document management application 104 can be a web-based application or can be a device-installed application (also referred to as app). The computing device 102 and the document management application 104 are communicatively coupled to the document management server 106 via a network such as the Internet, intranet, Local Area Network (LAN), Wide Area Network (WAN), telephone network, virtual private network (VPN), and the like. The document management application 104 and the document management server 106 collectively form a document management system, marked as 105. Few non-limiting examples of the document management system includes Onbase, Laserfiche, HubSpot, M-Files, DocuShare, etc. The document management system 105 manages different versions of the same document. Specifically, the document management system 105 manages different versions of the same document based on a location of a user who is uploading a document version, accessing a document version, and so on.

The document management system 105 provides various functionalities such as secure/controlled access, centralized storage, streamlined search & retrieval, tracking, and maintaining records of different versions of the same document. The document management system 105 can be accessed by any number of users at the same time from any location. The document management system 105 can be accessed based on login credentials such as username, user ID, password, passcode, OTP, other known or later developed login methods. The document management system 105 specifically, stores multiple versions of a document in a particular folder or subfolder, for example, medical record. The document here refers to a version of the document. For example, if a document is uploaded for a first time in the folder "medical record", it can be considered as a first version of the document. But if the folder "medical record" already includes 2 documents then further uploaded document can be considered as version 3 of the document. So the folder "medical record" includes 3 document versions. These document versions can be uploaded by different users, or by the same user without limiting the scope.

A user uses the computing device 102 for his day-to-day tasks such as chatting, surfing, sending/receiving emails, creating/editing documents, or the like. Various examples of the computing device 102 may be a laptop, a personal computer, a mobile device, a personal digital assistant or any known or later developed computing device. The computing device 102 runs several applications such as a word processing application, a document editor application, a web browser, or the like. In context of the current disclosure, the computing device 102 includes the document management application 104 that provides a user interface to the user for managing different versions of documents. For example, the document management application 104 allows the user to upload a document version, access a document version, edit a document version, and so on.

In operation, a user accesses the document management application 104 for one or more reasons such as uploading, accessing, editing, or the like. The document management application 104 includes a location option. The user can enable the location option. Once the location option is enabled, the document management application 104 determines the location of the user using one or more ways, discussed below. When the user uploads a document version such as medical form 1 in the folder "medical record", the document management application 104 sends the upload request to the document management server 106 along with the location of the user. The document management server 106 receives the document version medical form 1 and stores the medical form 1 with location along with other properties associated with the document version such as document name, version description, document description, and so on. In this manner, multiple users can upload different document versions in the folder "medical record". The document management server 106 stores the document version for later retrieval, use and/or access.

Later when a user accesses the folder "medical record" to see document versions, a document version that matches the location of the user is retrieved from the document management server 106 and displayed to the user as a preferred document version. For example, if the user location is New Delhi, a document version matching his location is automatically retrieved and shown to the user. If there is another user whose location is Mumbai, India, the document version matching this location property is automatically retrieved and shown to the user. Thus, the document management system 105 automatically displays a document version matching the location of the user. This way, the user does not require to manually look for document versions relevant based on his location.

Exemplary System

Figure 2:
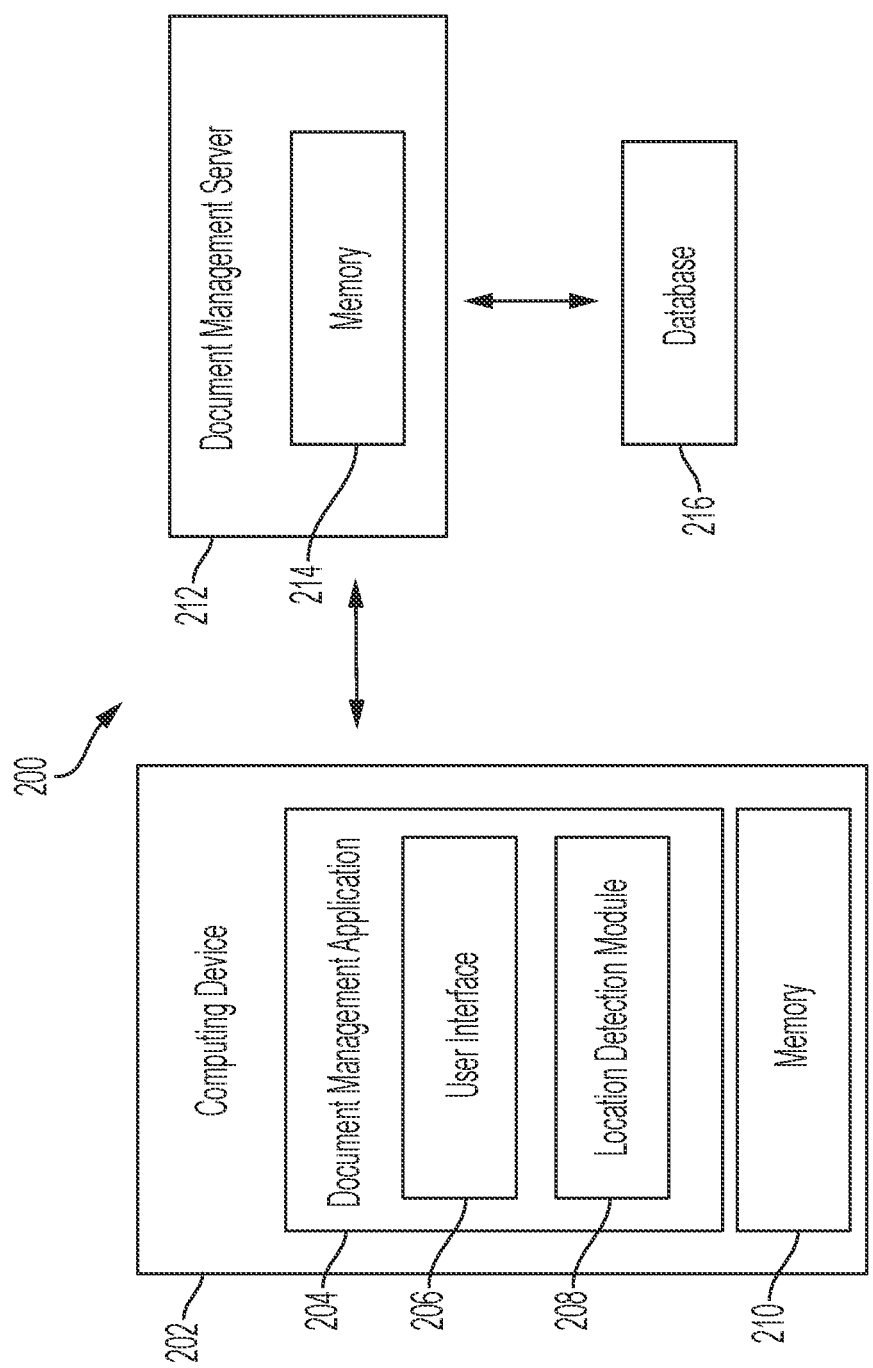
FIG. 2 is a block diagram illustrating a system for managing different versions of a document in a document management system, in accordance with an embodiment of the present disclosure.

FIG. 2 is a block diagram of an overall system 200 for managing different versions of a document. The system 200 includes a computing device 202, a document management server 212, and a database 216. The computing device 202 further includes a document management application 204. The document management server 212 includes a memory 214. The computing device 202 and/or the document management application 204 is communicatively coupled to the document management server 212 via a communication network. The communication network may be the Internet, intranet, Local Area Network (LAN), Wide Area Network (WAN), telephone network, virtual private network (VPN), other known networks or later developed networks. The document management application 204, the document management server 212 and/or the database 216 collectively forms the document management system. The database 216 as shown is a database external to the document management server 212 but the database 216 can be a part of the document management server 212. The system 200 may further include additional component(s) as required to implement the current disclosure.

The implementation begins when a user wishes to upload a document version and/or access a document version. In one implementation, uploading a document version will be discussed and in further implementation, accessing a document version will be discussed. In the first implementation, the user here accesses the document management application 204 to upload a document version. The document management application 204 is a web application that can be accessed using a web browser or can be an application pre-installed on the computing device 202. The document management application 204 communicates with the document management server 212 in real-time. The document management application 204 is a front-end including a user interface 206 with one or more functions such as upload, track, store, access, or the like. To this end, the user is first required to sign-in through a valid user account registered on the document management server 212 using valid credentials. In case of a new user, the user is required to register a new account on the document management server 212 and then sign-in through the registered account. Here, the user signs-in by inputting/providing valid credentials associated with the registered user account. Once the user enters the valid credentials, the user is authenticated based on the credentials provided by the user. Few examples of the credentials may be username, password, passcode, user ID, employee ID, employee code, or a combination thereof.

Figure 3A:
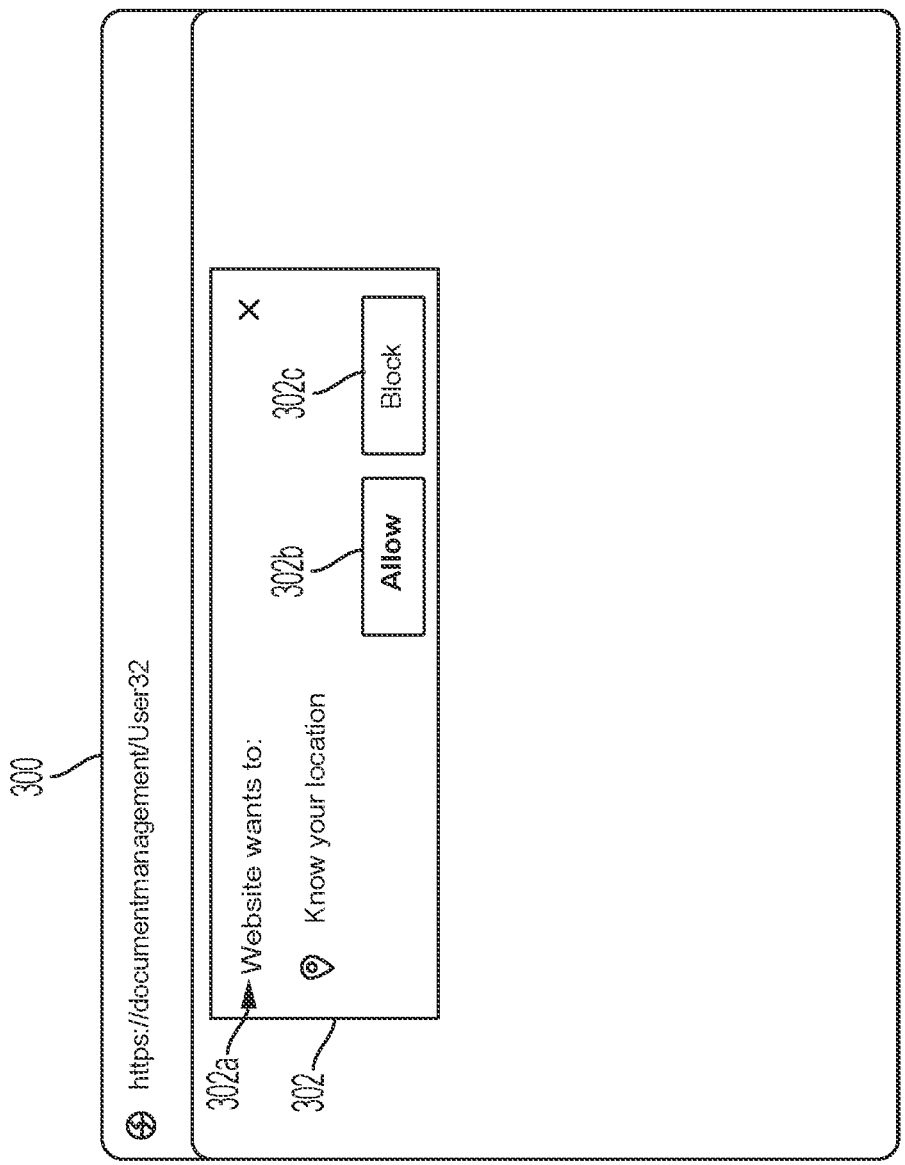

Upon successful authentication, the document management application 204 provides a user interface 206 to the user. The user interface 206 includes multiple options such as upload, manage, track, edit, store, or the like. In context of the current disclosure, the user interface 206 of the document management application 204 includes a new option such as a location option. The user can enable the location option if he wishes the document management system to obtain his location while performing an action. Here, the user enables the location option. Once enables, the user interface 206 displays a message, e.g., a pop-up message, seeking permission from the user to obtain the user's current location. One exemplary snapshot of a user interface such as 300 displayed to the user is shown in FIG. 3A. As illustrated, the user interface 300 displays a pop-up message 302 to seek permission from the user to track the user's current location. The pop-up message 302 includes a message portion labeled as 302a and options, namely 'allow' labeled as 302b and 'block' labeled as 302c. The user can select the allow option 302b to allow the document management system, specifically, the document management application 204 to track the user's location. If the user wishes, the user can select the block option 302c to block the website from obtaining the user's current location. The pop-up message 302 can be displayed only once, when the user signs-in for the first time, or can be displayed every time the user accesses his account. In context of the current disclosure, the user selects the allow option 302b so that the document management application 204 can obtain the location of the user. The location refers to the current location of the user or the location of the user from where the user is accessing the document management system/application.

The document management application 204, specifically, the location detection module 208 identifies the current location of the user. The location detection module 208 identifies the current location of the user using any known or later developed methods. For example, the location detection module 208 identifies the current location of the user using an IP address of the computing device 202. In another example, the location detection module 208 directly obtains the current location of the user from a GPS module (not shown) of the computing device 202. In further example, the location detection module 208 obtains the current location of the user using any third-party app (not shown) integrated with the browser. This way, the document management application 204 obtains the current location of the user. Further, the current location is in the form of geographical coordinates such as latitudes and longitudes.

Figure 3B:
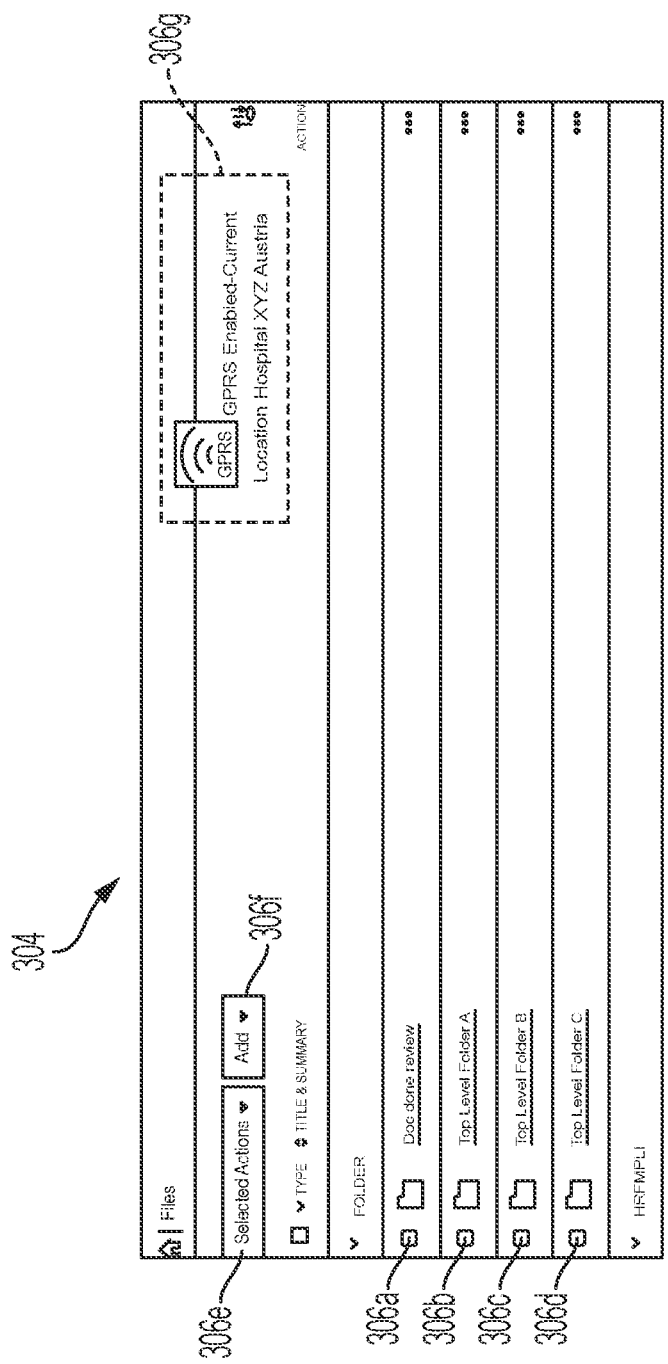

The user interface 206 displays a home page of the user account. The home page includes various information such as user name, members of the account, documents, document folders, or the like. Further, the user interface 206 displays various options that allow the user to perform various tasks such as add/upload documents, manage uploaded documents, create tasks, monitor task progress, or the like. One exemplary snapshot of a user interface such as 304 of the document management application 204, is shown in FIG. 3B. The user interface 304 shows a home page of the document management application 204. As illustrated, the user interface 304 displays various folders such as 306a, 306b, 306c, and 306d (collectively 306), where each folder 306 includes different document versions uploaded by the same user and/or different users. The user interface 304 displays options, such as 306e and 306f. The option 306e lists various actions that can be performed by the user such as manage document versions, edit document versions, view document versions or the like. The option 306f allows the user to add a document version. The user interface 304 further displays the current location (marked as 306g) of the user. In the context of the disclosure, the user uploads a document version, for example, $1^{st}$ version of a document. Thus, the user selects the option "Add" 306f.

Figure 3C:
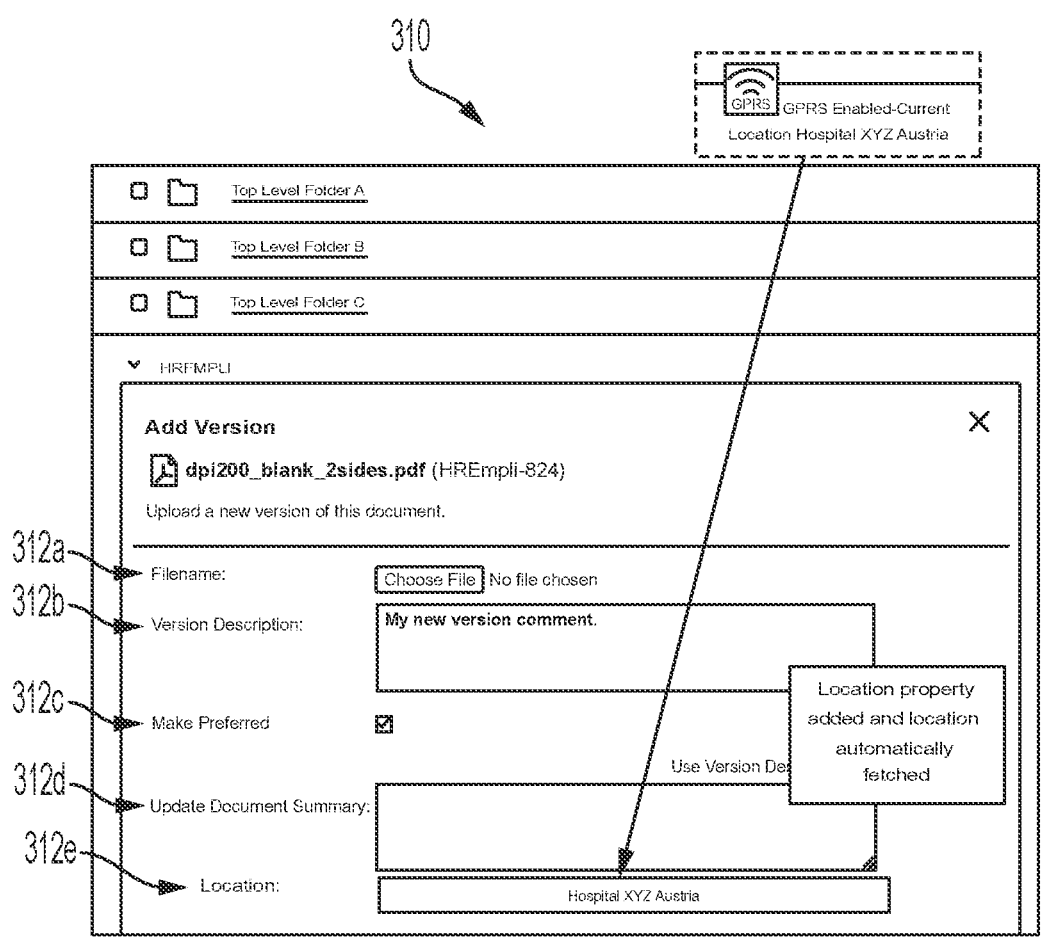

Once selected, the user interface 206 displays various options, such as an option to select a document version to upload and options that allow the user to add properties related to the document, e.g., document name, document summary, version comment, authors, or the like. Further, the user interface 206 displays the current location of the user, as detected by the location detection module 208. FIG. 3C illustrates one such exemplary snapshot of a user interface such as 310 displayed to the user when the user selects the option Add 306f, as discussed in FIG. 3B. As illustrated, the user interface 310 includes various options such as file name 312a, version description 312b, make preferred 312c, and update document summary 312d that allow the user to add a document version and add properties related to the document version. Further, the user interface 310 shows location marked as 312e. In one example, the user selects a document that is pre-stored in the memory 210 of the computing device 202 for uploading. Further, the document selected by the user may be a PDF file, a word file, a PNG file, a JPEG file, and the like. Thereafter, the user initiates further processing by selecting an option, e.g., 'Add' option.

Once selected, the document management application 204 receives the document selected by the user, the location of the user and additional properties related to the document such as name, version summary, or the like. Further, the document management application 204 creates a document identifier corresponding to the document. Here, the document management application 204 creates a new document identifier when a new document is uploaded or a $1^{st}$ version of the document is uploaded. If a new version, i.e., $2^{nd}$ version, $3^{rd}$ version, etc., of a pre-stored document is uploaded then a new document identifier may not be created, instead, the previously created document identifier is obtained and used for further processing. Further, the document management application 204 creates a version identifier corresponding to the version of the document uploaded by the user. Every time a user uploads a new version of the pre-stored document, the document management application 204 creates a version identifier. In one example, the version identifier may be created based on the date and time when a particular version is uploaded. Once done, the document management application 204 sends the document version, the location of the user and other properties such as version summary, file name, etc., as discussed above in detail to the document management server 212.

The document management server 212 then receives the details including the document version, the location of the user and other relevant properties associated with the document version. The document management server 212 associates or maps the received document version with the received document identifier, version identifier and location of the user. Further, the document management server 212 stores the received document version along with the location of the user and other properties of the document in the memory 214 of the document management server 212. The document management server 212 may store the document version along with the location of the user and other properties of the document in the database 216. The document management server 212 obtains the memory address (of the database 216 or memory 214) where the document version and information related to the document version are stored. The document management server 212 associates the memory address with the version identifier and the location, and stores the memory address along with the version identifier and the location. The document management server 212 maintains a repository of all the document identifiers, version identifiers, associated locations and corresponding memory addresses. Here, each version of the document is associated with a document identifier to identify the document and the document identifier of two or more versions of the document is same. Further, each version of the document is associated with a unique version identifier and each version of the document is associated with the location from where the version is uploaded. Additionally, corresponding to each version of the document, a memory address is assigned where the version of the document is stored.

Figure 3D:
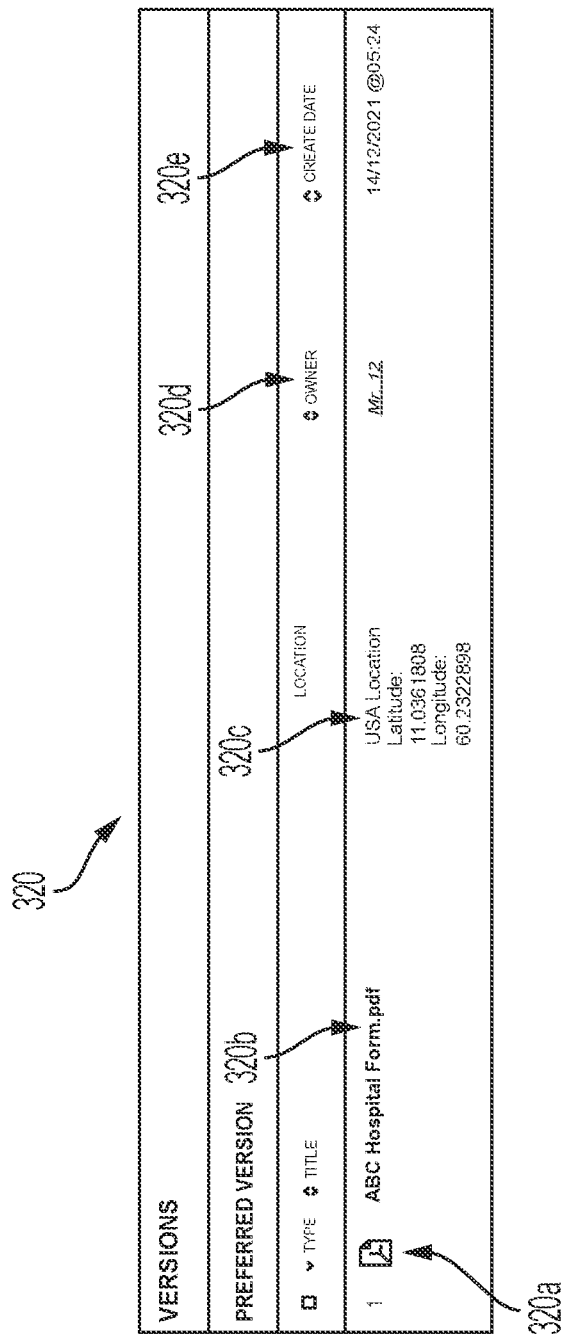
Figure 3E:
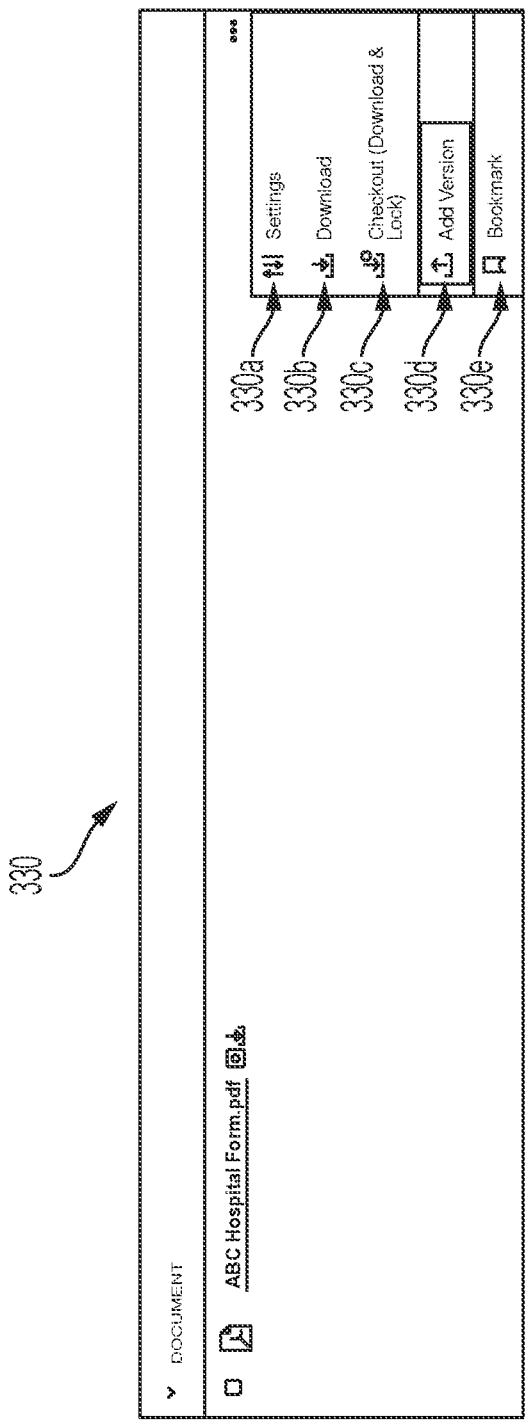

After storing, the document management server 212 sends the update to the document management application 204. The document management application 204, specifically the user interface 206 displays a preview of the stored document version. The user interface 206 may also display information such as name of the document, location from where the document version is uploaded, and the like. The user interface 206 may also display a thumbnail of the document version. FIG. 3D illustrates one such exemplary snapshot of a user interface such as 320. As illustrated, the user interface 320 displays the document thumbnail (labeled as 320a), document name (labeled as 320b), location (labeled as 320c), owner (labeled as 320d), or create date (also referred to as date of upload, marked as 320e). Further, the user interface 206 of the document management application 204 displays various options that allow the user to manage the uploaded document version such as settings, download, check-out, add version, bookmark, or the like. FIG. 3E illustrates one such exemplary snapshot of a user interface 330. As illustrated, the user interface 330 displays various options such as settings 330a, download 330b, checkout 330c, add version 330d, and bookmark 330e, collectively 330. These options 330 allow the user to manage the uploaded document version. For example, if the user wishes, he can download that document version. In another example, the user can bookmark a document version using the option 330e. In further example, the user can further add a document version using the option 330d.

This way, the $1^{st}$ version of the document is uploaded/stored on the document management server 212 and the uploaded $1^{st}$ version of the document is displayed to the user. Similarly, remaining versions of the document are stored one by one in the document management server 212 and corresponding to each version of the document, a document identifier, a version identifier, a location and a memory address are stored in the document management server 212.

In detail, when the user wishes to add a new version, e.g., $2^{nd}$ version, of the already uploaded document, the user again accesses the document management application 204 and signs-in through the registered user account. Here, the user sign-in through the same user account used for uploading the $1^{st}$ version of the document. The user signs-in through the registered user account by inputting valid credentials. In some implementations, another user may want to upload a $2^{nd}$ version of the already uploaded document, in that case, this user uses his account with the document management system 200 for uploading the document version. Once input, the document management application 204 authenticates the user and provides access to the user account. Further, the location detection module 208 obtains the current location of the user. Thereafter, the user selects an option, e.g., add version option, (as discussed in FIG. 3E) provided corresponding to the already uploaded document to add another version of the document. Once selected, the user interface 206 again displays various options (as discussed in FIG. 3C), that allow the user to select a document, add properties and view the current location of the user. Once displayed, the user selects a document and adds properties related to the document version, and initiates processing by selecting the option, e.g., add option.

The document management application 204 obtains the document, previously created document identifier, i.e. the document identifier created while uploading the $1^{st}$ version of the document and additional information related to the document version. Further, the document management application 204 creates a version identifier corresponding to the current version of the document. Thereafter, the document management application 204 sends the document and information related to the document, i.e., document identifier, version identifier, location and additional information such as name, version summary, or the like, to the document management server 212.

As discussed above, the document management server 212 associates the obtained document (version of the document) with the document identifier, version identifier and location of the user. Thereafter, the document management server 212 stores the document identifier, version identifier and the location in the memory 214 of the document management server 212. Further, the document management server 212 may store the document version, and additional information related to the document version in the database 216. The document management server 212 obtains the memory address where the document version and information related to the document are stored in the database 216. Once obtained, as discussed earlier, the document management server 212 associates the memory address with the version identifier and location, and stores the memory address along with the version identifier and the location.

This way, the new version, i.e., $2^{nd}$ version of the document is uploaded/stored on the document management server 212. Similarly, remaining versions of the document are stored in the document management server 212 and corresponding to each version of the document, the document identifier, a version identifier, a location, and a corresponding memory address are stored in the document management server 212. Further, the user interface 206 displays the uploaded one or more versions of the document.

Typically, the user interface 206 displays a single version of the document, which is referred as the preferred version. The remaining versions of the document can be viewed in the user interface 206 of a separate folder or a section, which can be a version history section, version management section, or the like. FIG. 3F illustrates an exemplary snapshot of a user interface 340 which displays all the versions of the document uploaded by the user. As illustrated, the user interface 340 includes two sections, namely the preferred version (labeled as 342a) and all versions (labeled as 342b). The preferred version 342a includes the version 344a which is configured as the preferred version for the user based on his location and the preferred version is displayed in the document folder. Further, all versions section 342b includes a list of all versions such as 344a and 344b of the document uploaded by the user. In the context of the disclosure, the preferred version is set and/or displayed to the user based on the current location of the user.

Accessing Document Versions

After uploading different versions of the document to the document management server 212 from one or more different locations, the user or other users may access the document management application 204 to access one or more document versions. To this end, the user is first required to sign-in through the same user account through which different versions of the document are uploaded. Thus, the user enters the valid credentials and the document management application 204 authenticates the user.

Post successful authentication, the document management application 204 provides the user access to the user account. Further, the document management application 204 obtains the current location of the user. Once obtained, a preferred version of one or more documents is set for the user based on the obtained current location of the user. In detail, when a user accesses a document folder, i.e., the folder including one or more different document versions, the document management application 204 obtains document identifiers corresponding to each document present in the accessed document folder. Once obtained, the document management application 204 sends the one or more document identifiers and the current location of the user to the document management server 212.

The document management server 212 processes one or more document identifiers and the location information and accordingly identifies a preferred version of the document for the user. To accomplish this, the document management server 212 firstly compares the obtained document identifiers one by one with the pre-stored list of the document identifiers to identify the relevant document. Once identified, the document management server 212 compares the location of the user with the locations associated with different versions of the identified document. Thereafter, the document management server 212 identifies the memory address where the identified version is stored and retrieves the document version stored in the identified memory address. Once retrieved, the document management server 212 sets the retrieved document as the preferred version and sends the retrieved document version to the document management application 204. Once received, the document management application 204, specifically the user interface 206 displays the received document version as the preferred version.

This way, the document management server 212 first associates each version of the one or more documents with a location, which is the location from where the particular version of the document is uploaded. Thereafter, the document management server 212 sets or defines a preferred version for the user based on his current location. To accomplish this, the document management server 212 compares the current location of the user with the locations associated with the different versions of the document and accordingly sets a preferred version of the document. Here, if the current location of the user matches with a location associated with a particular version of the document, then the version (associated with the matched location) is set as the preferred version. However, if the current location of the user does not match with any location associated with different versions of the document, then the document management server 212 set the preferred version based on a rule set by the user or organization. In such scenario, the last uploaded/edited version of the document may be considered as the preferred version of the document or the $1^{st}$ version of the document may be configured as the preferred version.

In one example, it is considered that a user uploads two fresh documents, i.e., $1^{st}$ versions of two documents (Doc-A and Doc-B). Here, the $1^{st}$ versions of the documents, namely Doc-A and Doc-B are named as Doc-A.1 and Doc-B.1, respectively, for better understanding. Similarly, $2^{nd}$ versions are named as Doc-A.2 and Doc-B.2. Here, the user uploads the documents from a user account associated with the document management server 212 and in a common folder, e.g. Folder A. Further, the user uploads both the Documents (Doc-A.1 and Doc-B.1) from a first location, which is ABC Building USA (Latitude: 11.0361909, and Longitude: 60.2322989). Once uploaded, the document management server 212 associates the first location (ABC Building USA) with the $1^{st}$ versions, i.e., Doc-A.1 and Doc-B.1. Thereafter, the user uploads $2^{nd}$ version of both documents (Doc-A.2 and Doc-B.2) from a second location which is XYZ Building, France (Latitude: 13.0362809, and Longitude: 80.2322909). Once the user uploads the $2^{nd}$ version of the documents, the document management server 212 associates the second location (XYZ Building France) with the $2^{nd}$ versions, i.e., Doc-A.2 and Doc-B.2.

Now, when a user accesses the same user account from the second location, i.e., XYZ Building France, and accesses the folder, i.e., Folder A including the documents (Doc-A and Doc-B), the document management server 212 sets the $2^{nd}$ versions, i.e., Doc-A.2 and Doc-B.2 as the preferred version for the user. Further, if the user accesses the same user account from the first location, i.e., ABC Building USA, and accesses the folder, i.e., Folder A, including the documents (Doc-A and Doc-B), the document management server 212 configures the $1^{st}$ versions, i.e., Doc-A.1 and Doc-B.1 as the preferred version for the user.

Continuing with the same example, if $1^{st}$ user accesses the same user account from $1^{st}$ location (ABC Building, USA) and at the same time $2^{nd}$ user accesses the same user account from the $2^{nd}$ location (XYZ Building, France), then the document management server 212 sets the $1^{st}$ versions, i.e., Doc-A.1 and Doc-B.1, as the preferred version for the $1^{st}$ user and sets the $2^{nd}$ versions, i.e., Doc-A.2 and Doc-B.2, as the preferred version for the $2^{nd}$ user.

This way, the system 200 allows the user to upload a document version, where his location information is associated and/or stored while storing the document version. The system 200 further allows the user to access a document version and the document version matching the location of the user from where he is accessing the document version is considered. Accordingly, the corresponding document version is shown to the user.

The memory 210 stores user details, documents, or other details. The memory 214 stores document versions, document identifiers, version identifiers, location information of the user or other relevant details for implementing the current disclosure. Similarly, the database 216 stores document versions, document identifiers, version identifiers, location information of the user or other relevant details for managing different versions of the document.

Exemplary Snapshots

Figure 4A:
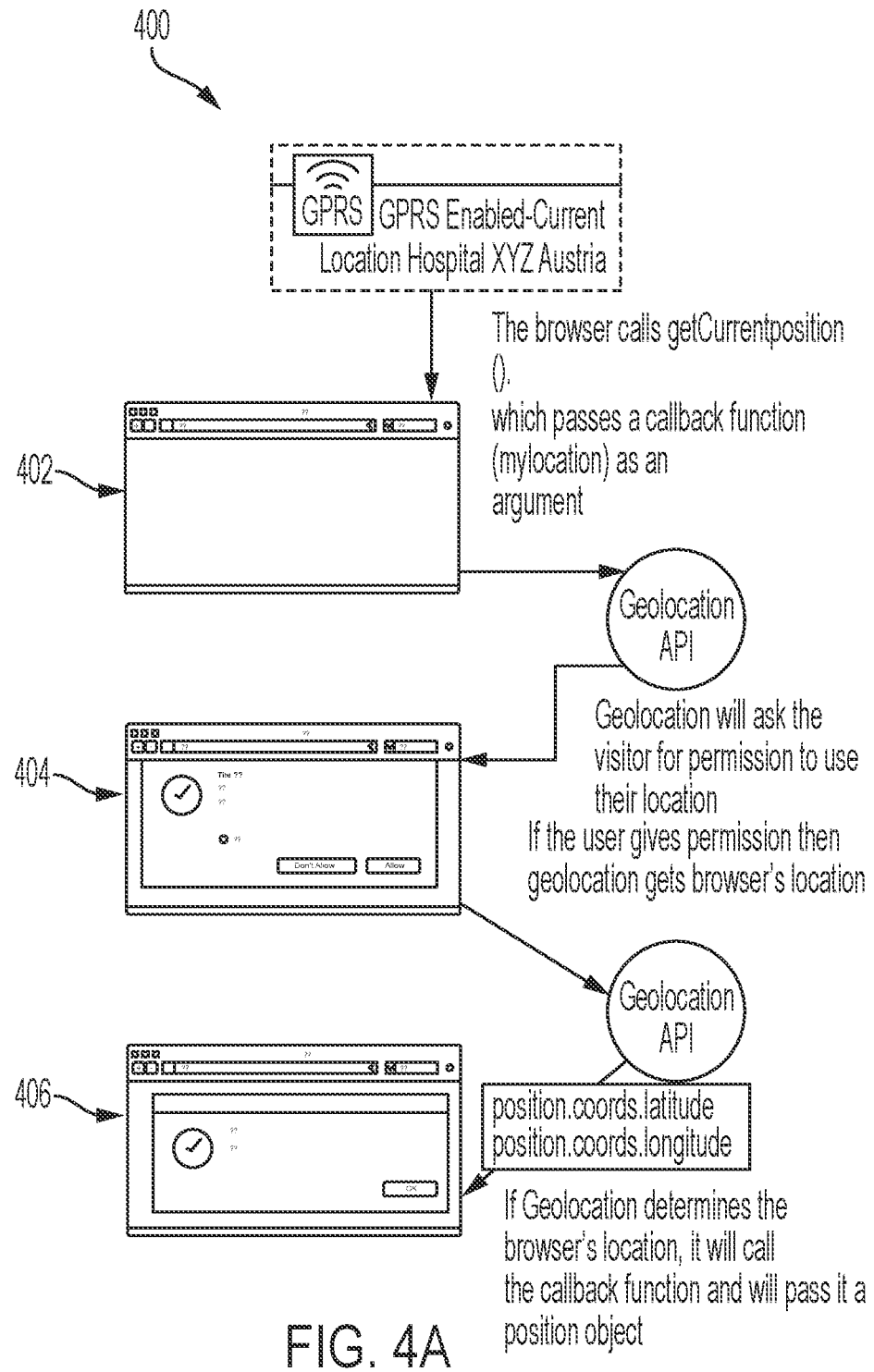

FIG. 4A illustrates an exemplary snapshot 400 of an algorithm implemented to track user's current location. The implementation begins post successful authentication of the user when the user accesses a webpage/home page of the user account registered on the document management server. At 402, a location tracking software/plug-in is called and executed. Thereafter, at 404, the software displays a pop-up message seeking permission from the user to track the user's current location. Once the user allows the tracking of the user's current location, at 406, the software/plug-in obtains the current location of the user and the current location information includes coordinates, which may be represented in latitude and longitude of the location where the user is currently located.

Figure 4B:
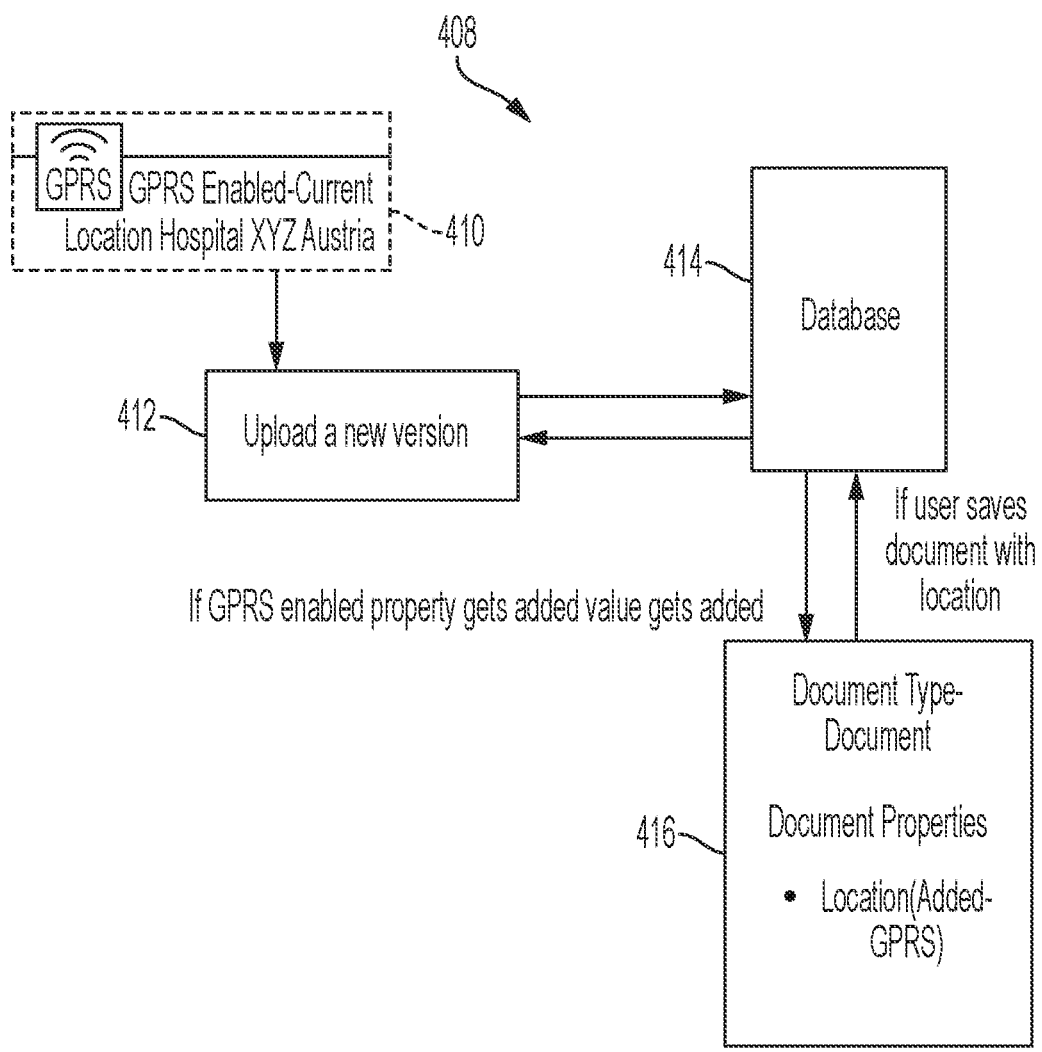

FIG. 4B illustrates a method flow diagram 408 for implementing the present disclosure. The method 408 begins when a user wishes to upload one or more versions of a document. Thus, the user first accesses a user account registered on the document management server after entering valid credentials. Once successfully authenticated, a message seeking approval for tracking user's current location is displayed to the user. Here, it is considered that the user accesses the user account from Hospital XYZ Austria.

Now, when the user allows the tracking of the user's current location, at 410, the current location which is Hospital XYZ Austria is obtained. Thereafter, the user selects a document and selects an option, e.g., add version option, to add a new version of the document. Thereafter, at 412, the user uploads a new version of the document by selecting a document and uploading the selected document version. Once uploaded, at 414, the user selected document version and the user's current location is sent for storing in the database. Once received, at 416, the document is stored in the database and the current location of the user, i.e., Hospital XYZ Austria, is added as a property to the document version. This way, the different versions of one or more documents are stored in the database and for each version (for which location tracking is enabled) obtained current location is added as a property so that a preferred version of the document can be set for the user based on his current location.

Figure 4C:
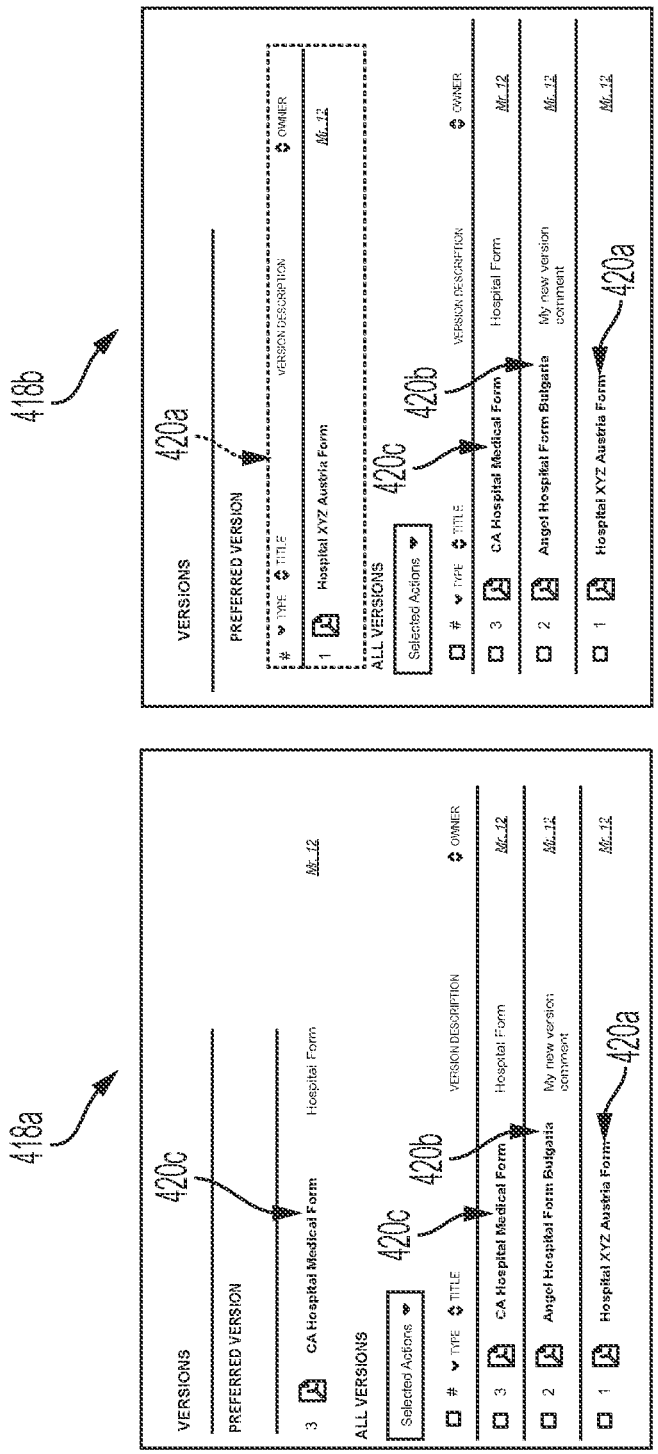

FIG. 4C illustrates exemplary snapshots of user interfaces 418a and 418b illustrating an implementation of the current disclosure. Here, it is considered that a user stores three versions of a document, namely 420a, 420b and 420c through a common user account registered on a document management server. Further, all the three versions of the document are uploaded from different locations. The $1^{st}$ version 420a is uploaded from a first location which is XYZ Hospital Austria, the $2^{nd}$ version 420b is uploaded from a second location which is Angel Hospital, Bulgaria, and the $3^{rd}$ version 420c is uploaded from a third location which is CA Hospital, Canada.

Now, when a user accesses the user account from the 3 location, i.e., CA Hospital Canada, the user interface 418a is displayed to the user. As illustrated, the $3^{rd}$ version 420c is set as the preferred version for the user. Further, when a user accesses the user account from a $1^{st}$ location, i.e., XYZ Hospital Austria, the user interface 418b is displayed to the user. As illustrated, the $1^{st}$ version 420a is set as the preferred version for the user.

Figure 4D:
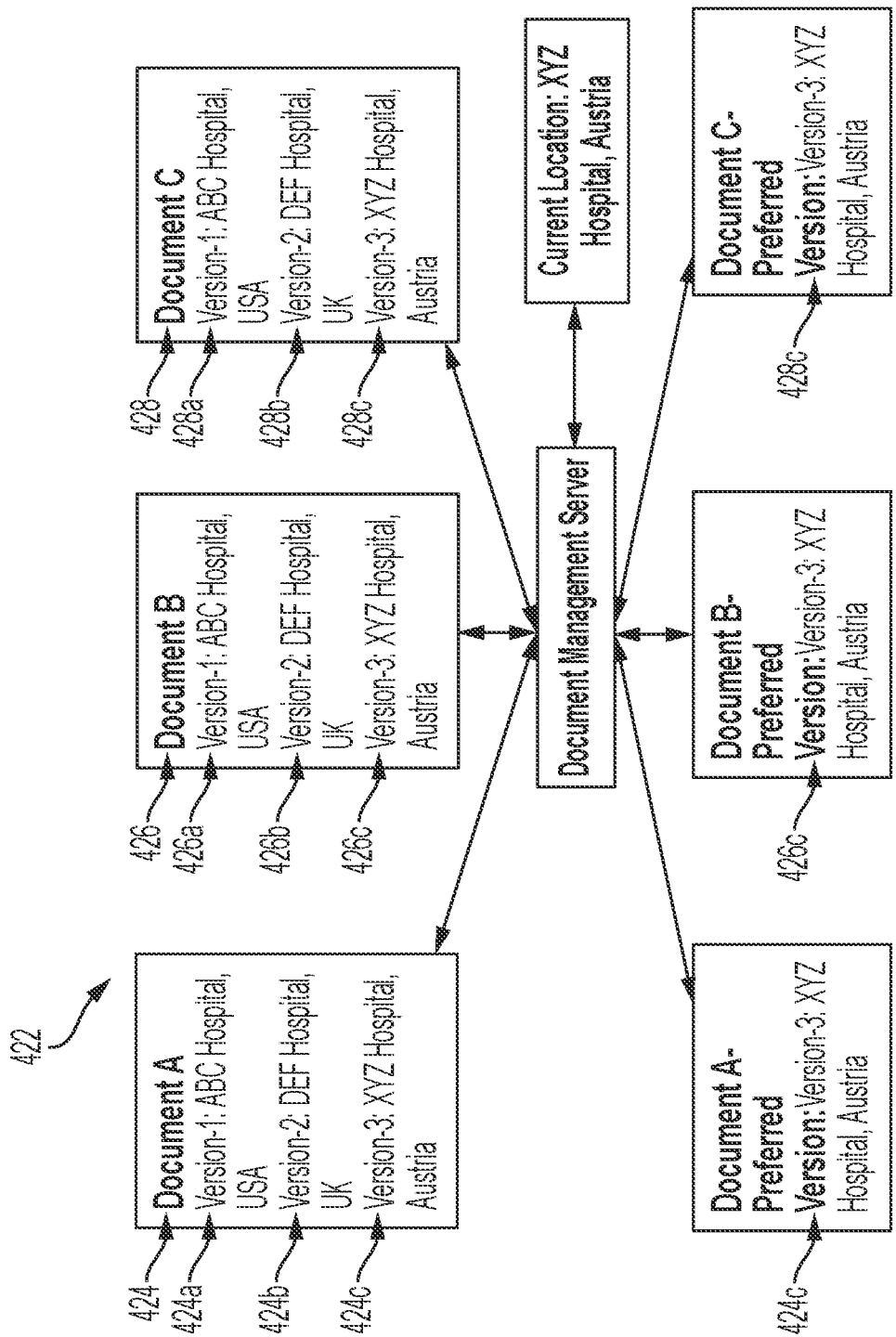

FIG. 4D illustrates an exemplary implementation 422 of the current disclosure. Here, it is considered that the user uploads the documents, namely Document A (labeled as 424), Document B (labeled as 426), and Document C (labeled as 428) through a user account registered on the document management server. Further, for each document (424, 426, 428) three versions of the documents are stored/uploaded from three different locations. For instance, $1^{st}$ version (424a, 426a, 428a) of all the three documents are uploaded from ABC Hospital USA, $2^{nd}$ version of documents (424b, 426b, 428b) are uploaded from DEF Hospital UK, and $3^{rd}$ version of documents (424c, 426c, 428c) are uploaded from XYZ Hospital Austria.

Now, as illustrated, when a user accesses the user account from XYZ Hospital, the document management server configures the $3^{rd}$ version (424c, 426c, 428c) as the preferred version, i.e., the version of the documents associated with the current location of the user are set as the preferred version.

FIG. 4E illustrates an exemplary implementation 440 of the current disclosure. Here, it is considered that the user uploads three versions of a document which are labeled as 444a, 444b, and 444c through a user account registered on the document management server 442. Here, it is considered that the user uploads the $1^{st}$ version 444a from a $1^{st}$ location, $2^{nd}$ version 444b from a $2^{nd}$ location, and $3^{rd}$ version from a $3^{rd}$ location.

Now, when a user uses a computer A 446 from a $3^{rd}$ location and accesses the document management server 442 using the same user account, the $3^{rd}$ version 444c is set as the preferred version and the user can check the document version. Further, when a user uses a computer B 448 from a $1^{st}$ location and accesses the document management server 442 using the same user account, the $1^{st}$ version 444a is defined and displayed as the preferred version and the user can check the document version.

Exemplary Flowcharts

Figure 5:
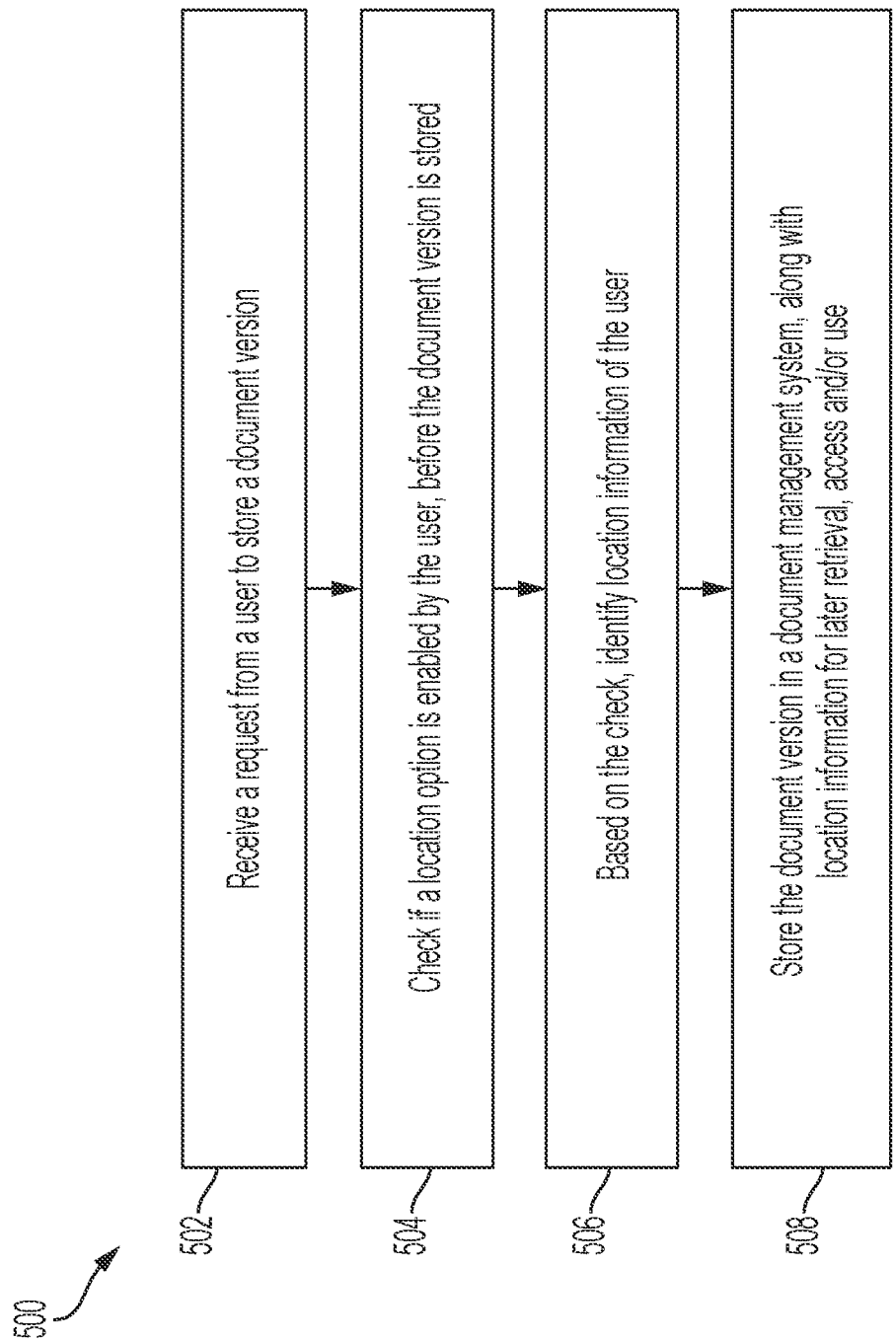
FIG. 5 is a method flowchart for storing multiple versions of a document in a document management system, in accordance with an embodiment of the present disclosure.

FIG. 5 is a method flowchart 500 for storing multiple versions of a document in a document management system. The method 500 may be implemented at a document management system, such as the document management system of FIG. 1, or the document management system of FIG. 2. However, the method 500 can be implemented at any equivalent device with document storage, document management, version management functionalities, and so on.

The method 500 begins when a user wishes to store/upload one or more documents on the document management system. Thus, the user accesses a document management application which is a front-end of the document management system to access the document management system. The document management application can be a device-installed application or web application that can be accessed via a web browser. To this end, the user is required to first sign-in through a valid user account registered on the document management server using valid credentials. Once the user provides the valid credentials, the user is authenticated. Once successfully authenticated, a user interface including various options such as upload, manage, track, edit, store, or the like, is displayed to the user. In context with the current disclosure, a location tracking option is displayed to the user. The user can enable the location option if he wishes the document management system to obtain his location while performing the action. Here, the user enables the location option. Further, once the user is successfully authenticated a home page of the user account is displayed. The home page includes various information such as user name, members of the account, documents, document folders, or the like. Further, more options are displayed to the user that allow the user to perform various tasks such as add/upload documents, manage uploaded documents, create tasks, monitor task progress, or the like. In the context of the disclosure, the user wishes to upload a document version, for example, $1^{st}$ version of a document. Thus, the user selects an option, e.g., add document option, to select and upload a document ($1^{st}$ version of a document).

Once selected, at 502, a request from a user to store a document version is received.

At 504, before storing, it is checked whether the user enabled the location option. As discussed earlier, the user enables the location option.

Therefore, at 506, the location of the user is identified. The location of the user is identified using any known or later developed methods. Further, once the user selects the option to add a document version, various options are displayed to the user that allows the user to select and upload a document version and add properties related to the document version. Exemplary options include an option to select a document to upload, options to allow the user to add properties related to the document, e.g., document name, document summary, version comment, authors, or the like. Further, the location of the user is displayed to the user. Thereafter, the user selects a desired document and adds properties related to the document version, and initiates further processing by selecting an option, e.g., 'Add' option. Once selected, the document selected by the user, location of the user and additional properties related to the document such as name, version summary, or the like, are received. Once received, firstly a document identifier is obtained. Specifically, the document management application creates a document identifier corresponding to the document. Here, a new document identifier is created only when a new document is uploaded or a $1^{st}$ version of the document is uploaded. If a new version, i.e., $2^{nd}$ version, $3^{rd}$ version, etc., of a pre-stored document is uploaded, then a new document identifier is not created, instead, the previously created document identifier is obtained and used for further processing. Further, the document management application creates a version identifier corresponding to the version of the document uploaded by the user. Every time a user uploads a new version of the pre-stored document, a version identifier is created. Once the document identifier and version identifier are obtained, the document management application sends the document, the location of the user, document identifier, version identifier, and other properties such as version summary, file name, etc., to the document management server.

At 508, the document version is stored in the document management system along with the location information for later retrieval, access and/or use. Specifically, the document management server associates the received document with the received document identifier, version identifier and location of the user. Further, the document management server stores the received document version along with the location of the user and other properties of the document in the memory of the document management server. The document management server may store the document and additional information related to the document in the database and obtain the memory address. Once obtained, the document management server associates the memory address with the version identifier and location, and stores the memory address along with the version identifier and the location. The document management server maintains a repository of all the document identifiers, version identifiers, associated locations and corresponding memory addresses.

This way, the $1^{st}$ version of the document is uploaded/stored on the document management server and the uploaded $1^{st}$ version of the document is displayed to the user. Similarly, the remaining versions of the document are stored one by one in the document management server and corresponding to each version of the document, the document identifier, a version identifier, a location and a memory address are stored in the document management server.

The method 500 can be implemented in the form of non-transitory computer-readable medium. The non-transitory computer-readable medium stores instruction, which when executed by one or more processors cause the one or more processors to: execute blocks 502, 504, 506 and 508.

Figure 6:
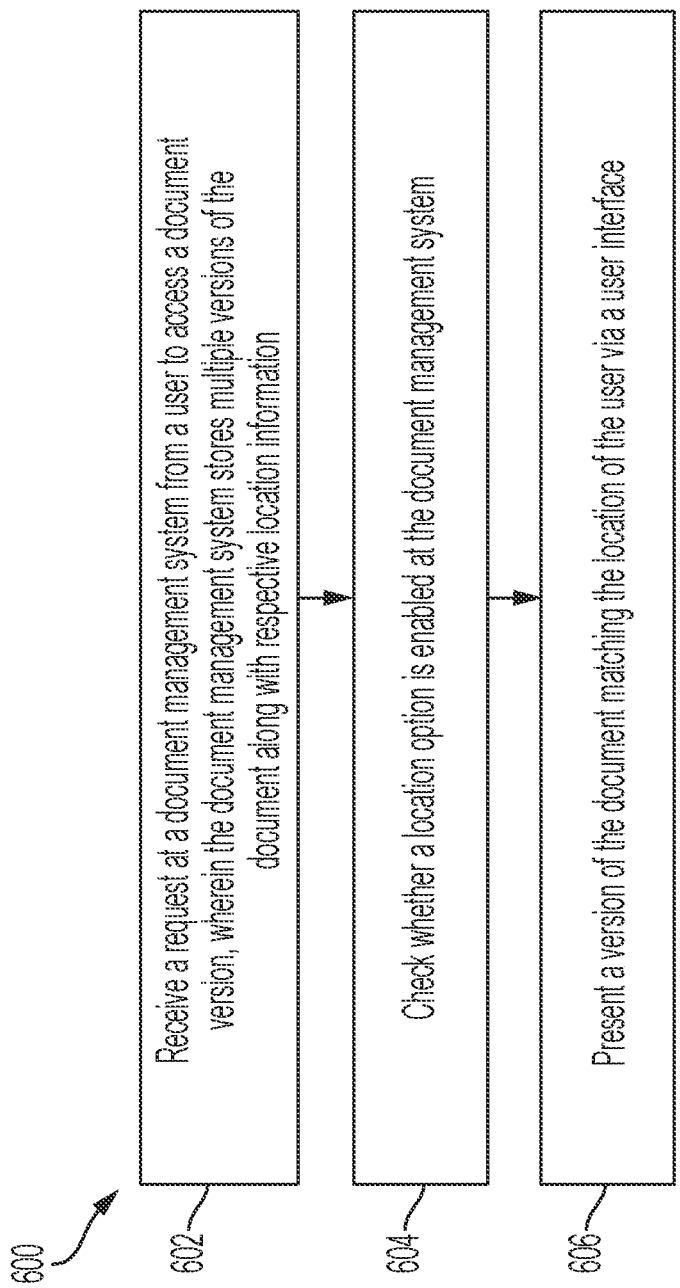
FIG. 6 is a method flowchart for managing different versions of a document in a document management system, in accordance with an embodiment of the present disclosure.

FIG. 6 is a method flowchart 600 for managing different versions of a document in a document management system. The method 600 may be implemented at a document management system, such as the document management system of FIG. 1, or the document management system of FIG. 2. However, the method 600 can be implemented at any equivalent device with document storage, document management, version management functionalities, and so on.

To begin with, a user is first required to upload different versions of one or more documents on the document management system. In the context of the disclosure, the user uploads the different versions of the document from different locations. Further, while uploading the document, the user enables the location tracking option to allow the document management system to track the user's location from where the user uploads the different versions of the document. Thus, the document management system stores the different versions of the document along with the respective location information from where the document versions are uploaded. Now, when a user wishes to access the documents, the user is required to sign-in through the same user account through which the different versions of the documents are stored. Once the user signs-in successfully, a home page is displayed to the user. The home page displays various document folders, account-related information, and various options to allow the user to perform various operations. In the context of the disclosure, the user selects a document folder.

Once selected, at 602, a request from a user to access a document at the document management system is received.

As discussed earlier, the document management system stores multiple versions of the document along with respective location information.

Once the request is received, at 604, it is checked whether a location option is enabled. Here, it is considered that the location option is enabled. Thus, the location of the user is determined.

Once determined, at 606, a version of the document matching the location of the user is presented via the user interface. In detail, when a user accesses a document folder, i.e., the folder containing one or more different documents, document identifiers corresponding to each document present in the accessed document folder is obtained. Once obtained, the document identifiers and the current location of the user are sent to the document management server for further processing. Once received, the document management server processes the received document identifiers and the location information and accordingly identifies a preferred version of the document corresponding to each document identifier. To accomplish this, the document management server firstly compares the obtained document identifiers one by one with the pre-stored list of the document identifiers to identify the requested document. Once identified, the document management server compares the obtained current location with the locations associated with different versions of the identified document. Thereafter, the document management server retrieves the identified version. Once retrieved, the document management server configures the retrieved document as the preferred version and sends the retrieved document to the document management application. Once received, the document management application displays the received document as the preferred version.

This way, the document management system first associates each version of the one or more documents with a location, which is the location from where the particular version of the document is uploaded. Thereafter, the document management system sets a preferred version of the one or more documents for a user based on the current location of the user.

The method 600 can be implemented in the form of non-transitory computer-readable medium. The non-transitory computer-readable medium stores instruction, which when executed by one or more processors cause the one or more processors to: execute blocks 602, 604, and 606.

The present disclosure discloses methods and systems to manage different versions of a document in a document management system. The methods and systems associate different versions of the document with corresponding locations from where the different versions of the documents are uploaded. Thereafter, the method and systems automatically set a preferred version for the user. Thus, methods and systems offer convenience to the user and enhance the user experience, as the user is not required to manually configure a preferred version. Further, the preferred version is set for the user based on the current location of the user, which is very helpful, especially for the users such as medical representatives, insurance agents, and the like, who travel frequently to different locations. Thus, the document management system can be implemented in any industry such as healthcare, government, public sector, banks, insurance industry, or the like. For instance, if a user uploads different versions of an application form in the document management system from different embassies in the city and enables the location tracking feature, then, later when the user accesses the document management system, different versions of the document are displayed as the preferred version to the user based on the location of the user from where the user is accessing the document management system.

The methods and systems manage different versions of a document in a document management system. The methods and systems provide automatic preferred document tagging & retrieval based on the location of users. Specifically, the disclosure proposes an enhanced document management system with location tagging/associated at the version level, allowing enhanced retrieval features. The enhanced document management system automatically sets the preferred version of a document for a user based on the location of the user where they are accessing it from.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as managing, receiving, storing, matching, identifying, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for managing different versions of a document in a document management system, based on location, the method comprising:
   receiving a request at the document management system from a user to access a document version, wherein the document management system stores multiple versions of the document along with respective location information indicative of a location of the user when the user uploaded the document, and wherein the location is automatically added as a property while storing the multiple versions of the document in the document management system for later retrieval, access, and/or use;
   checking whether a location option is enabled at the document management system;
   based on the check, automatically setting a preferred version of the document as a version matching a current location of the user from where the user is accessing the document; and
   presenting, via a user interface, the preferred version of the document for further action, wherein presenting comprises displaying, via the user interface, the preferred version of the document, matching the current location of the user, for further action, thereby allowing the user to easily access the preferred version of the document.

2. The method of claim 1, wherein the document management system stores at least one version of the document based on the location of the user.

3. The method of claim 1, further comprising, identifying the location of the user.

4. The method of claim 1, further comprising, identifying a version of the document matching the current location of the user.

5. The method of claim 1, further comprising, matching the current location of the user with location of different versions of the document stored with the document management system.

6. The method of claim 1, further comprising, allowing the user to upload one or more versions of the document at the document management system.

7. The method of claim 6, further comprising, checking whether the location option is enabled by the user.

8. The method of claim 6, further comprising, storing a version of the document along with location information of the user.

9. The method of claim 6, further comprising, displaying a different document version as a preferred version of the document based on location of another user, for further action.

10. A document management system for managing different versions of a document, comprising:
 a database for storing multiple versions of a document, wherein at least one version of the document is stored along with location information indicative of a location of a user when the user uploaded the document, and wherein the location is automatically added as a property while storing the multiple versions of the document in the document management system for later retrieval, access, and/or use;
 a server for:
  receiving a request from a user to access a version of the document;
  checking whether a location option is enabled at the document management system;
  receiving location information of the user;
  automatically retrieving a document version matching a current location of the user; and
  automatically setting a preferred version of the document as a version matching the current location of the user from where the user is accessing the document; and
 an application for presenting the retrieved document version to the user for further action, wherein the version of the document, matching the current location of the user, is displayed, via a user interface, as the preferred version of the document, for further action, thereby allowing the user to easily access the preferred version of the document.

11. The document management system of claim 10, wherein the application obtains the location of the user.

12. The document management system of claim 10, wherein the server identifies a version of the document based on the location of the user.

13. The document management system of claim 10, wherein the server matches the current location of the user with location information associated with different versions of the document stored in the database.

14. The document management system of claim 10, wherein the application allows a user to upload one or more document versions at the document management system.

15. The document management system of claim 14, wherein the server checks whether the location option is enabled by the user.

16. The document management system of claim 14, wherein the server stores a document version along with the location information in the database.

17. The document management system of claim 14, wherein the server adds location as a property while storing the document version, in the document management system for later retrieval and/or use.

18. A method for storing multiple versions of a document in a document management system, the method comprising:
 receiving a request from a user to store a document version;
 before storing, checking if a location option is enabled by the user;
 based on check, identifying location information of the user;
 storing the document version in the document management system, along with location information indicative of a location of a user when the user uploaded the document for later retrieval, access and/or use, wherein storing comprises adding location as a property while storing the document version in the document management system for later retrieval and/or use:
 automatically setting a preferred document version as a document version matching a current location of the user from where the user is accessing the document;
 receiving a request from the user to access a document version; and
 displaying the preferred document version to the user matching the current location of the user, for further action, thereby allowing the user to easily access the preferred document version.

\* \* \* \* \*